(No Model.)

A. P. ODELL.
Pitman Rod.

No. 240,452. Patented April 19, 1881.

Witnesses.

Inventor.
A. P. Odell,
per
F. A. Lehmann,
Atty

UNITED STATES PATENT OFFICE.

ALBERT P. ODELL, OF BRADFORD, PENNSYLVANIA, ASSIGNOR OF ONE-HALF TO E. H. BARNUM, OF SAME PLACE.

PITMAN-ROD.

SPECIFICATION forming part of Letters Patent No. 240,452, dated April 19, 1881.

Application filed February 17, 1881. (No model.)

*To all whom it may concern:*

Be it known that I, ALBERT P. ODELL, of Bradford, in the county of McKean and State of Pennsylvania, have invented certain new and useful Improvements in Pitman-Rods; and I do hereby declare the following to be a full, clear, and exact description of the invention, such as will enable others skilled in the art to which it pertains to make and use it, reference being had to the accompanying drawings, which form part of this specification.

My invention relates to an improvement in pitman-rods; and it consists in placing in between the inner tapering ends of the two brasses two angular tapering double wedges, which are made adjustable by means of screws, and which wedges serve not only to complete the circle, but do away with all necessity of ever having to remove the brasses for the purpose of being filed, as will be more fully described hereinafter.

The object of my invention is to so construct the brasses that a perfect and true circle will be formed around the wrist-pin, and do away with all necessity of ever having to take the brasses out of the straps for the purpose of filing or planing them, which requires skilled labor to perform.

Figure 1:
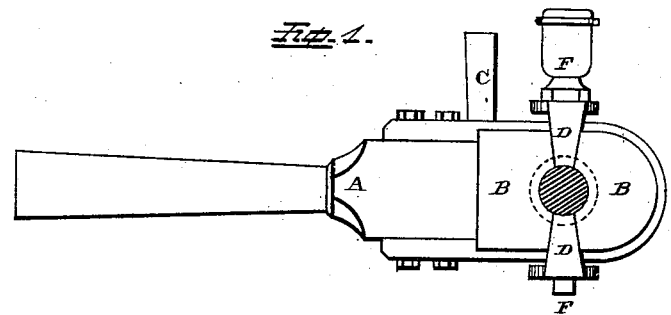
Figure 2:
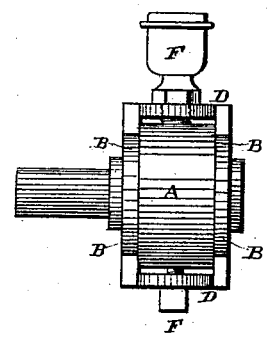
Figure 3:
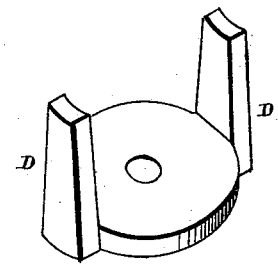

Figure 1 is a side elevation of a pitman embodying my invention. Fig. 2 is an end view of the same. Fig. 3 is a perspective of one of the wedges.

A represents an ordinary pitman-rod, having a strap secured to its end; B B, the two brasses, and C the key for tightening them upon the wrist-pin, all of which are constructed in the usual manner.

Instead of having the inner ends of the two brasses made straight, as is customary, they are here made tapering, as shown, and in between them are placed the angular double wedges D. These wedges straddle over the strap, as shown in Fig. 2, and have their ends to fit in between the two brasses and bear against the sides of the wrist-pin in such a manner as to form a perfect circle and close all opening between the ends of the brasses, as shown in Fig. 1.

Passing through the central parts of each one of the wedges into the strap is an adjusting-screw, F, which will be provided with jam-nuts, or constructed in any other suitable manner. As here shown, the upper one of these screws is formed into an oil-cup for the purpose of lubricating the wrist-pin. By having these wedges close all openings between the ends of the brasses, all dust, dirt, and cinders are prevented from getting in between the brasses and gradually working into the bearings and cutting the brasses.

Whenever the brasses become worn in the slightest degree it is only necessary to slacken the set-screws which pass through the double angular wedges, then tighten up upon the key, and again move the wedges inward by tightening up upon their screws. After the brasses have been worn to any considerable extent the wedges are removed and their sides filed away, so as to make them somewhat thinner, and they are again ready for use.

It will be readily seen from the above construction that it is never necessary to remove the brasses from the strap until they have been worn almost completely away, and that any inexperienced hand can readily tighten the brasses upon the wrist-pin.

As heretofore constructed, the brasses have been simply separated from each other, leaving a space between each of their ends, which was free to become filled with dirt, cinders, and other substances, which, by working into the bearings, caused the brasses to be cut very rapidly. As a consequence the brasses in a very short time require to be fitted, either by filing or planing, and this can only be done by skilled labor. Where the brasses upon steamboats have to be repaired in the usual manner, the boat is usually laid up for several days to enable this to be done. By means of my construction the brasses can be used until worn out, and the only part which ever has to be removed after they have once been put into position are the wedges, and they have simply to be reduced slightly in width, so as to allow the brasses to approach nearer together.

I am aware that it is not new to pass two screws through the strap from opposite sides, so that their inner ends will fit between the brasses, and this I disclaim. My invention differs from this in the use of double wedges, which straddle over the sides of the strap and entirely close the spaces between the ends of the brasses.

Having thus described my invention, I claim—

1. The combination of the pitman-rod, the two brasses, a key, and the double angular wedges and their adjusting-screws, substantially as shown.

2. In a pitman-rod, the combination of the two brasses and suitable wedges, which are to be placed between them, and which wedges serve to close the opening between their ends, so as to keep out dirt and cinders, substantially as described.

In testimony whereof I affix my signature in presence of two witnesses.

ALBERT P. ODELL.

Witnesses:
A. C. KISKADDEN,
WM. H. KERN.